US006258867B1

(12) United States Patent
Nodelman et al.

(10) Patent No.: US 6,258,867 B1
(45) Date of Patent: Jul. 10, 2001

(54) METHOD FOR MAKING SEMI-RIGID ENERGY-ABSORBING FOAM WITH POLYURETHANE FILLERS

(75) Inventors: Neil H. Nodelman, Pittsburgh; David D. Steppan, Gibsonia, both of PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/360,378

(22) Filed: Jul. 23, 1999

(51) Int. Cl.[7] .................................................... C08L 75/04

(52) U.S. Cl. .......................... 521/137; 521/112; 521/128; 521/155; 521/159; 521/170; 521/174

(58) Field of Search .................................... 521/112, 155, 521/159, 170, 174, 137, 128

(56) References Cited

U.S. PATENT DOCUMENTS 5,489,617 2/1996 Miller et al. ......................... 521/112

OTHER PUBLICATIONS

Neil H. Nodelman et al, "A Viable Technology for the Recycling of Polyurethane Energy–Absorbing (EA) Foams", presented at the society of Automotive Engineers (Feb. 1997).

Dimitroff, "New Surfactants and Catalysts Developed for Energy–Absorbing Polyurethane Foam", Polyurethane Expo, (1996).

D.F. Sounik, D.W. McCullough, J.L. Clemons & J.L. Liddle, Dynamic Impact Testing of Polyurethane Energy Absorbing (EA) Foams, SAE Technical Paper No. 940879. (Mar. 1994).

*Primary Examiner*—John M. Cooney, Jr.
(74) *Attorney, Agent, or Firm*—Joseph C. Gil; Diderico van Eyl; Lyndanne M. Whalen

(57) ABSTRACT

A method for making an energy-absorbing foam with polyurethane fillers that produces an energy-absorbing foam with properties that are comparable to a foam made without fillers.

11 Claims, No Drawings

METHOD FOR MAKING SEMI-RIGID ENERGY-ABSORBING FOAM WITH POLYURETHANE FILLERS

FIELD OF THE INVENTION

The invention relates to the field of recycled energy-absorbing foams.

BACKGROUND OF THE INVENTION

An energy-absorbing foam is a specially designed foam that reduces the load a passenger of a vehicle experiences, thereby reducing potential injury. There has been a long-felt need in the automotive industry to develop a method for making an energy-absorbing foam with recycled polyurethane fillers that has properties that are comparable to a foam made without fillers. Ideally, such a method would reduce the amount of automotive shredder residue which ends up in landfills after automobiles are scrapped. Reusing or recycling polyurethane foams would also reduce the need for fresh reactants resulting in conservation of our petroleum reserves. Also, such a method would reduce the amount of polyurethane waste that is currently disposed of—a substantial amount. Each year, for instance, more than 10 million automobiles containing an appreciable amount of polyurethane outlive their usefulness and are scrapped. Of those automobiles scrapped from 1980 to 1994, there was an average of about 90 kg (200 lbs.) of plastic per vehicle. Of that, roughly 25% was polyurethane.

There are two methods for recycling polyurethane foams. In one method involving glycolysis, the foam is ground and the polyurethane is transesterified by heating in a low molecular weight glycol such as ethylene or diethylene glycol to give a mixture of urethane-containing polyols and free glycol. The mixture is then used as a chain extender in a fresh polyol blend. The method is disadvantageous because it is an energy intensive chemical process and because small amounts of aromatic diamines can be formed as a by-product of glycolysis.

In another method, polyurethane regrind is used as a filler by suspension in a fresh polyol blend. In this process, small pieces of foam (4 to 8 in. cubes) are first reduced to particles less than 0.5 in. using a common granulator or rotary knife cutter. The particles are then reduced to a powder using one of a number of techniques which use shear, impact or compressive forces, to pulverize the foam (such as those using fitzmills, hammermills, air-swept pulverizers, and two-roll mills). The powder is typically collected with a centrifugal cyclone filtering system after which it is packaged and readied for introduction into the polyol as filler. Measured amounts of polyurethane powder are added via a feed screw to a predetermined quantity of polyol in a blend tank. A uniform mixture can be created by thorough agitation with a high-speed mixer capable of handling high viscosity liquids. Particles should be smaller (<200 microns) than the original cell size because intact cells will swell with polyol blend, rendering the system with an unprocessable viscosity. The use of fillers in such foam-making methods have produced foams with undesired energy-absorbing properties, and as such, the methods have not been used with any appreciable degree of commercial success.

U.S. Pat. No. 5,847,014 is directed to an isocyanate-reactive mixture containing at least one non-filled polyether polyol, at least one non-tertiary amine containing polyether polyols, and water. The patent is also directed to a water-blown energy absorbing foam produced by reacting this mixture with (i) a polymethylene poly(phenyl isocyanate), a silicone cell-opening surfactant, catalysts, and at least one tertiary amine catalyst. The patent does not discuss the making of polyurethane foams with polyurethane fillers.

Nodelman et al, "A Viable Technology for the Recycling of Polyurethane Energy-Absorbing (EA) Foams" presented at The Society of Automotive Engineers (February 1997), discloses that the compressive strength of a semi-rigid polyurethane foam made with polyurethane fillers can be influenced by the surfactant used to stabilize the cellular structure before gellation. The paper also shows that addition of a solid filler to polyurethane foam reduces the impact strength during dynamic impact testing if a specific surfactant is used. The reference discloses an energy-absorbing foam made with polyurethane fillers which allegedly has properties that are comparable to a foam made without fillers. The paper, however, does not describe the surfactant that is used. In view of the fact that there are literally millions of different types of surfactants that can be used to make energy-absorbing foams, the reference does not enable the invention.

In Dimitroff, "New Surfactants and Catalysts Developed for Energy-Absorbing Polyurethane Foam", Polyurethanes Expo, 1996, the authors discuss surfactants which are said to form foam having a high open-cell content with good cell stabilization. The paper discusses systems which involve rigid, friable isocyanurate foams and does not discuss systems involving semi-rigid foams. The paper does not discuss systems in which foams are made with fillers.

It would be desired to develop a method for making a recycled foam that overcomes the disadvantages discussed above.

SUMMARY OF THE INVENTION

The invention relates to a method for making an energy-absorbing foam with a polyurethane filler and a very specific surfactant component having a viscosity less than about 2500 cp at room temperature and a high viscosity, high molecular weight non-hydrolyzable polyether-siloxane silicone cell-opening surfactant, that produces a foam with energy-absorbing properties that are comparable to a foam made without a recycled component. The method reduces the amount of materials used to make polyurethane foams and reduces the amount of polyurethane waste. These and other features, aspects, and advantages will become better understood with reference to the following description and appended claims.

DESCRIPTION OF THE INVENTION

The method involves reacting A) a polyisocyanate component containing polymethylene poly(phenyl) isocyanates; with B) a polyol component that includes (i) a first polyol having at least one polyol having hydroxy functionalities of 2 or 3 and molecular weights of from about 1,000 to about 8,000 in an amount ranging from about 30 to 80 parts, based on the weight of the polyol component, and (ii) a second polyol containing at least one polyol having functionality greater than 2 and molecular weight less than 1,000 in an amount of from about 20 to about 70 parts by weight, based on the weight of the polyol component, (ii) a surfactant component having a viscosity that is less than about 2500 cp and a high viscosity, high molecular weight polyether-siloxane silicone cell-opening surfactant in an amount that is at least about 0.3 wt. %, based on the weight of the polyol component; (iii) water in an amount that is at least 1 wt. %, based on the total weight of the polyol component; and (iv) a catalyst component in an amount that is at least about 0.05 wt. %, based on the weight of the polyol component; and C) polyurethane fillers in an amount that is at least 10 parts, based on the weight of the polyol component.

The invention is based on the surprising discovery that by using a particular combination of polyisocyanates, isocyanate-reactive components, a specific surfactant component and remarkably, polyurethane fillers, it is now possible to make an energy-absorbing foam that exhibits compressive strength and/or dynamic impact properties that are comparable to foams made without fillers. This is surprising because conventional methods which utilize fillers and other surfactant components were known to produce foams with reduced compressive strength and reduced dynamic impact properties as compared to foams made without fillers. Indeed, conventional thinking taught that since polyurethane fillers displaced the reactive urethane foam, a smaller amount of the reacting liquid mixture was introduced into the mold. The expanding foam, still required to fill out the part volume, results in a lower urethane matrix density with degraded physical properties.

The polyisocyanate component includes any polyisocyanate that can meet the objects of the invention. Preferably, the polyisocyanate component generally includes polymethylene poly(phenyl) isocyanates, also known as polymeric MDI and available as Mondur MR from Bayer Corporation. Known processes for preparing the aniline/formaldehyde condensates and the resultant polyisocyanates are described in the literature and in many patents, e.g., U.S. Pat. Nos. 2,683,730, 2,950,263, 3,012,008, 3,344,162 and 3,362,979, incorporated herein by reference in entirety. The isocyanates useful herein contain from about 40 to about 85% by weight of methylene bis(phenyl isocyanate) and have an isocyanate group content of from about 20 to about 35% by weight, preferably from about 30 to about 35% by weight, and most preferably from about 31 to about 33%. The isocyanate index of the total system is from about 80 to about 130. Other polyisocyanates include the hydrocarbon diisocyanates, (e.g., the alkylenediisocyanate and the arylene diisocyanates) as well as known triisocyanates.

The polyol component generally includes a) at least two different polyols, b) a surfactant component, c) a blowing agent, and d) a catalyst component in amounts sufficient to produce a foam having a substantially homogenous fine cell structure and energy-absorbing properties (compressive strength and dynamic impact testing properties) that are comparable or better than foams made without fillers.

The polyols generally include (i) polyethers having hydroxy functionalities of 2 or 3 and molecular weights of from about 1,000 to about 8,000 and (ii) polyethers having a functionality greater than 2 and a number molecular weight that is less than about 1000. These polyethers and their methods of manufacture are generally well known in the art. Examples of suitable polyethers include non-filled polyether polyols based on glycerin, propylene oxide, and ethylene oxide (17% by weight) with a 35 OH No. available as Multranol 9143 from Bayer Corporation; filled polyols (20% by weight solids (polyurea)) based on glycerin, propylene oxide, and ethylene oxide (17% by weight) with a 28 OH No. available as Multranol 9151 from Bayer Corporation; polyether polyols based on propylene glycol, propylene oxide and ethylene oxide (13% by weight) with a 28 OH No., available as Multranol 9182 from Bayer Corporation; polyether polyols based on ethylene diamine and propylene oxide (630 OH No.), available as Multranol 4050 from Bayer Corporation. Suitable amine-initiated polyether polyols and the processes for their production are known and described in, for example, U.S. Pat. Nos. 4,877,879 and 5,786,405, and Japanese Abstracts 57168917A and 5716918, or mixtures thereof, all reference herein incorporated by reference in entirety. The amounts of the polyethers vary depending on the specific application. It has been discovered that polyethers having hydroxy functionalities of 2 or 3 and molecular weights of from about 1,000 to about 8,000 can be used from 30 to 80 parts by weight. Polyols having functionality>2 and molecular weight<1,000 are generally used from 20 to 70 parts by weight (based on total polyol component).

The surfactant component must include a high viscosity, high molecular weight, non-hydrolyzable silicone cell-opening surfactant. Generally, the surfactant has a number average molecular weight that is more than about 9,000 and a silicone-polyoxyalkylene oxide copolymer that is composed of two polyethers. The surfactacts are believed to have the structure of those surfactants taught in U.S. Pat. Nos. 5,145,879, and 5,489,617, incorporated herein by reference in entirety. Since the surfactant is extremely viscous, it must be diluted so that the surfactant component has a viscosity that is less than 2500 cp. Without dilution, the high viscosity copolymers have produced undesired results, presumably due to the difficulty in dispersing the copolymer in the foam matrix in the first few seconds allowed in the foaming process. As such, since the early stages of the foaming process are critical in the dispersion of the chemicals and the nucleation of bubbles, the inability of the viscous surfactants to disperse and dissolve leads to non-reproducible performance without dilution. The surfactant component can be made by known methods such as those described in U.S. Pat. No. 5,489,617. Examples of useful cell-opening silicone surfactants include those sold as L3801 (formerly known as UAX 6137 and UAX 6191) from WITCO. The amount of the surfactant is generally at least about 0.3, and more preferably from about 0.5 to about 2%, based on the weight of the polyol component.

The blowing agent can be any blowing agent that accomplishes the objects of the invention. Generally, water is used as the blowing agent. When water is used as the sole blowing agent, it is typically used in an amount that is at least 1 part, and preferably from about 1 to about 10 percent by weight based on 100% by weight of the polyol component. Suitable amounts for a specific application can be determined by routine experimentation. Of course, water may be used in combination with other blowing agents.

The reaction mixture can also contain at least one tertiary amine catalyst for catalyzing the reaction between isocyanate groups and hydroxyl groups (a urethane catalyst) or water (blowing agent). The urethane catalysts are generally known and include tertiary amines such as triethylamine, tributylamine, N-methylmorpholine, N-ethyl-morpholine, N-coco-morpholine, N,N,N',N"-tetramethyl-ethylene-diamine, 1,4-diaza-bicyclo-(2,2,2)-octane, N-methyl-N'-dimethyl-amino-ethylpiperazine, N,N-dimethylbenzylamine, bis-(N,N-diethyl-aminoethyl)-adipate, N,N-diethylbenzylamine, pentamethyl-diethylenetriamine, N,N-dimethyl-cyclohexylamine, N,N,N',N'-tetramethyl-1,3-butanediamine, N,N-dimethyl-β-phenylethylamine, 1,2-dimethyl-imidazole, 2-methylimidazole and the like. Also useful are the commercially available tertiary amines such as Niax A-1, available from WITCO; Thancat DD, available from Huntsman; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts.

Silaamines having carbon-silicon bonds as described, e.g., in German Patent No. 1,229,290 and U.S. Pat. No. 3,620,984, may also be used as catalysts. Examples include 2,2,4-trimethyl-2-silamorpholine and 1,3-diethylamino-ethyltetramethyl-disiloxane. Delayed action catalysts such as NIAX A-300, NIAX A-400, NIAX-107, DABCO 8154, DABCO DC-1 and DABCO DC-2 may also be used.

Additional catalysts that can be used include organometallic catalysts, among others. Some examples of suitable organometallic catalysts include organometallic compounds of tin, lead, iron, bismuth, mercury, and the like. Preferred organotin catalysts include compounds such as tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl) tin oxide, and the like. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis (isooctylmercapto-acetate), and di(isooctyl)tin bis (isooctylmercaptoacetate), all of which are commercially available from WITCO Chemical Corp., are especially preferred. The use of a delayed action catalyst such as an iron pentanedione or a bismuth carboxylate, as described in U.S. Pat. No. 4,611,044, herein incorporated by reference, is also possible. The polyisocyanate component and the isocyanate-reactive component are generally used at an equivalent ratio of about 1:1. Although it is not preferred, the polyol component may also contain a catalyst such as trimerization catalysts such as those described in U.S. Pat. No. 4,169,921, incorporated herein by reference in its entirety.

The polyurethane filler particles are generally suspended in the polyol component and are present in an amount that is sufficient to accomplish the objects of the invention. The polyurethane filler particles can be made by grinding a polyurethane foam by any method which pulverizes the foam into particles sufficiently small so that the cell structure of the original foam is not present. For instance, the foam can be fed through a hammermill multiple times until the resulting particles are fine enough to pass through a mesh screen having a mesh size that is 100. The size of the particles is generally less than 200 microns. Preferably, the size of the particles are less than 150 microns, and even more preferably less than 100 microns. The amount of the polyurethane filler particles used to make the foam is generally at least about 10 parts, based on 100 parts of the polyol component, and more preferably from about 20 to about 30, based on 100 parts of the polyol component.

The polyisocyanate component and the polyol component can be reacted together by known processes often using mechanical devices such as those described in U.S. Pat. No. 2,764,565, incorporated herein by reference. Details concerning the processing apparatus which may be used according to the invention may be found in Kunststoff-Handbuch, Volume VII, published by Vieweg and Höchtlen, Carl-Hanser-Verlag, Munich, 1966, pages 121 and 205.

The foaming reaction that produces foam products is generally carried out inside molds. In this version of the invention, the foamable reaction mixture is introduced into a mold which may be made of a metal such as aluminum or a plastics material such as an epoxide resin. The reaction mixture foams up inside the mold to produce the shaped product. The process of foaming in molds is carried out to produce a product having a non-cellular structure (skin) on its surface. The desired result can be obtained by introducing just sufficient foamable reaction mixture to fill the mold with foam after the reaction is completed.

By way of example, to make the recycled foams of the invention, a suitable amount of the polyisocyanate is placed in side "A" of a foam making machine. The polyol component is placed in the "B" side. A reaction injection molding (RIM) machine, is used to make the foamed blocks, e.g., a "Hennecke RIM-DO-MAT" machine with a Hennecke MQ-8 mixhead. Parts can be made in an open-pour process in a heated aluminum mold. A suitable injection pressure, e.g., 175 bar, is created on the polyol and isocyanate side and the throughput in the mixhead is maintained at a suitable rate. The unfilled polyol blend is heated to a suitable temperature, e.g., 30° C. in the RIM machine and at the 10% filler loading (18.7% on the B-side) the temperature is increased to 45° C. The isocyanate temperature can be run at 30° C. for the unfilled system and 35° C. for the filled system. For both filled and unfilled systems, the mold temperature is 55° C. and blocks are demolded in 5 minutes. The foams, with a free rise density between 2.7 and 3.0 pcf, are molded at 4.5 pcf. Of course, different processes can be used.

So-called "external mold release agents" known in the art such as silicone waxes and oils, are frequently used when foaming is carried out inside the molds. The process may also be carried out with the aid of so-called internal mold release agents, if desired, in combination with external mold release agents, e.g., those described in German Offenlegungsschriften Nos. 2,121,670 and 2,307,589. Remarkably, the properties of the recycled foams made in accordance with the invention are comparable to the properties of the foams made without fillers.

The energy-absorbing properties of the foams can be evaluated by determining the compressive strength and dynamic impact properties of the foams. The compressive strength of a foam can be determined with any suitable method, e.g., according to known ASTM tests with Instron tension devices. Dynamic impact properties include the maximum impact force a foam sample is subjected to as well as the maximum deflection a foam sample experiences when it is hit with an object, e.g., the length that the impacting tip of a sled penetrates the foam sample. Generally, the higher the deflection, the weaker (or softer) the foam. The residual energy of the sled manifests at the maximum deflection when the sled and the compressing foam slam against a restraining wall. Generally, softer foams exhibit higher impact forces since such foams do not absorb the momentum of the impacting sled as much as foams with better energy-absorbing properties. The crush strength can be determined from dynamic impact properties by well-known methods. Dynamic impact properties can be determined by any suitable means. To determine dynamic impact properties of a foam, for instance, a specially-designed dynamic impact sled can be used in accordance to the process discussed in U.S. Pat. No. 5,847,014 and further discussed in D. F. Sounik, D. W. McCullough, J. L. Clemons, and J. L. Liddle, *Dynamic Impact Testing of Polyurethane Energy-Absorbing (EA) Foams*, SAE Technical Paper No. 940879, (1994), incorporated herein by reference in its entirety.

The invention is further illustrated but is not intended to be limited by the following examples in which all parts and percentages are by weight unless otherwise specified.

EXAMPLES

Materials

In the examples which follow, the following materials were used:

A) a non-filled polyether polyol based on glycerin, propylene oxide, and ethylene oxide (17% by weight) with a 35 OH No. available as Multranol 9143 from Bayer Corporation;

B) a filled polyol (20% by weight solids (polyurea)) based on glycerin, propylene oxide, and ethylene oxide (17% by weight) with a 28 OH No. available as Multranol 9151 from Bayer Corporation;

C) a polyether polyol based on propylene glycol, propylene oxide and ethylene oxide (13% by weight) with a 28 OH No., available as Multranol 9182 from Bayer Corporation;

D) a polyether polyol based on ethylene diamine and propylene oxide (630 OH No.), available as Multranol 4050 from Bayer Corporation;

E) Water;

F) 70% Bis(dimethyaminoethyl), available as Niax A-1 from WITCO;

G) a low molecular weight, low viscosity silicone surfactant, available as B-4690 from Goldshmidt (this surfactant is used as a comparative surfactant);

H) a silicone surfactant, available as L-3801 from WITCO;

I) regrind (polyurethane fillers) prepared in accordance to the procedure discussed in Nodelman et al, *A Viable Technology for the Recycling of Polyurethane Energy-Absorbing* (*EA*) *Foams*, incorporated herein by reference in its entirety;

J) polymethylene poly(phenyl isocyanate) (polymeric MDI) available as Mondur MR, from Bayer Corporation; and K) 2-methylpentanediamine, available Dytek A from Dupont Formulations Formulations were made by combining the respective components of a polyisocyanate component and an isocyanate-reactive component with simple mixing techniques. Table 1 shows the different formulations that were used. Formulations of Example 1 are used for comparative purposes. The 0%, 10% and 12% regrind refers to the regrind based on the final foam block, further discussed below.

TABLE 1

| Component | Example 1 0% Regrind | Example 2 10% Regrind | Example 3 12% Regrind |
|---|---|---|---|
| A (B-Side) | — | 30 | 30 |
| B B-Side | 30 | | |
| C B-Side | 30 | 30 | 30 |
| D (B-Side) | 25 | 25 | 25 |
| E B-Side | 3 | 3.6 | 3.7 |
| F (B-Side) | 0.1 | 0.1 | 0.1 |
| G (B-Side) | 1 | — | — |
| H (B-Side) | — | 1 | 1 |
| I (B-Side) | 0 | 20.6 | 25.5 |
| J (A-Side) | 87.2 | 95.3 | 96.9 |
| Density | 3.86 | 4.03 | 4.16 |

Foam-Making Procedure

To make the foamed blocks, a reaction injection molding (RIM) machine, a Hennecke RIM-DO-MAT machine with a Hennecke MQ-8 mixhead was used. The parts were made in an open-pour process in a 10 in.×10 in.×2.5 in. heated aluminum mold. The injection pressure was 175 bar on the polyol and isocyanate side. The throughput in the mixhead was maintained at 120 g/sec. for 10% filled systems and 160 g/sec. for the unfilled control. The unfilled polyol blend was heated to 30° C. in the RIM machine and at the 10% filler loading (18.7% on the B-side) the temperature was increased to 45° C. The isocyanate temperature was run at 30° C. for the unfilled system and 35° C. for the filled system. For both filled and unfilled systems, the mold temperature was 55° C. and the blocks demolded in 5 minutes.

Foam-Testing Procedure

To determine the compressive strength of the foams, the Quasi-static compression (compressive strength) (CLD 50% full block (psi)) was tested according to ASTM D 1621-94, modified for full-block measurement, using an Instron 4200 series tension apparatus with a 10,000 lb. compression cell. Generally, the higher the number, the more compressive strength the foam has. Example 1 is a comparative example. Table 1 shows the formulations. Table 2 shows the compressive strength properties of the foams.

To determine dynamic impact properties of the foams a specially-designed dynamic impact sled in accordance to the process discussed in D. F. Sounik, D. W. McCullough, J. L. Clemons, and J. L. Liddle, *Dynamic Impact Testing of Polyurethane Energy-Absorbing* (*EA*) *Foams*, SAE Technical Paper No. 940879, (1994). The dynamic impact sled was designed by Hennecke Machinery Group and was a horizontal high-speed dynamic impact sled designed to impact a foam sample at speeds up to 35 mph. In the examples, the movable sled (tup) was cylindrical and weighed 19.5 kg. Table 3 shows dynamic impact properties of the foams.

TABLE 2

ENERGY-ABSORBING PROPERTIES
COMPRESSIVE STRENGTH

| | Example 1 0% Regrind | Example 2 10% Regrind | Example 3 12% Regrind |
|---|---|---|---|
| CLD 50% full block | 40 psi (2.76 bar) | 44.9 psi (3.10 bar) | 42.3 psi (2.91 bar) |

TABLE 3

DYNAMIC IMPACT PROPERTIES
(Dynamic impact, 17 mph, 43 lb. cylindrical top)

| | Example 1 0% Regrind | Example 2 10% Regrind | Example 3 12% Regrind |
|---|---|---|---|
| Max force | 5060 lbs (2277 kg) | 5014 lbs (2256 kg) | 5371 lbs (2417 kg) |
| Max deflection | 1.96 in (49.78 mm) | 1.92 in (48.77 mm) | 1.93 in (49.02 mm) |

Discussion

The compressive strength of the foams containing 10% and 12% polyurethane fillers (44.9 and 42.3 psi respectively) was higher than the compressive strength (40 psi) of the foam made without fillers. The dynamic impact properties results indicate that the 10% regrind foam had about the same crush strength as the unfilled control. The 12% regrind foam was only slightly weaker than the foam made without regrind. These results are not what is typically observed upon addition of a solid filler to a foam.

Comparative Examples I–IV

The procedure of Examples 2–3 was repeated except that a high molecular weight, cell-opening silicone surfactant was not used. Also, the formulations below were used. Table 4 shows the formulations. Table 5 shows the compressive strength properties of the foams. Table 6 shows dynamic impact properties of the foams.

TABLE 4

| FORMULATIONS | | | | |
|---|---|---|---|---|
| | I 0% Regrind | II 5% Regrind | III 8% Regrind | IV 10% Regrind |
| B (B-Side) | 30 | 30 | 30 | 30 |
| C (B-Side) | 30 | 30 | 30 | 30 |
| D (B-Side) | 25 | 25 | 25 | 25 |
| K (B-Side) | .1 | .1 | .1 | .1 |
| E (B-Side) | 3.0 | 3.2 | 3.35 | 3.35 |
| G (B-Side) | 1.0 | 1.0 | 1.0 | 1.0 |
| F (B-Side) | 0.1 | 0.1 | 0.1 | 0.1 |
| I (B-Side) | — | 9.9 | 15.8 | 15.8 |
| J (A-Side) | 86.7 | 89.6 | 91.8 | 96.6* |
| Density (pcf) | 4.1 | 4.0 | 4.0 | 3.9 |

*also contained 5% fillers, based on the total weight of the A component. The 0%, 5% and 8% and 10% regrind refers to the regrind based on the final foam block.

TABLE 5

| ENERGY-ABSORBING PROPERTIES COMPRESSIVE STRENGTH | | | | |
|---|---|---|---|---|
| | 0% Regrind | 5% Regrind | 8% Regrind | 10% Regrind |
| CLD 50% full block | 53.2 psi (3.67 bar) | 44.4 psi (3.06 bar) | 40.5 psi (2.79 bar) | 37.9 psi (2.61 bar) |

| DYNAMIC IMPACT PROPERTIES (Dynamic impact, 17 mph, 43 lb. cylindrical top) | | | | |
|---|---|---|---|---|
| | 0% Regrind | 5% Regrind | 8% Regrind | 10% Regrind |
| Max force | 4713 lbs (2121 kg) | 4883 lbs (2197 kg) | 5017 lbs (2258 kg) | 5807 lbs (2613 kg) |
| Max. deflection (in.) | 1.79 in (45.47 mm) | 1.92 in (48.77 mm) | 1.97 in (50.04 mm) | 2.01 in (51.05 mm) |

Discussion

The compressive strength of the foams made with fillers was less than the compressive strength of the foam made without fillers. The dynamic impact properties results show that as the % filler increases, the deflection increases (suggesting a softer foam). These results are what is typically observed upon addition of a solid filler to a foam.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A method for making an energy-absorbing foam with polyurethane filler particles comprising reacting:

A) a polymethylene poly(phenyl) isocyanate component with

B) a polyol component comprising:

(i) a first polyol comprising at least one polyol having a hydroxyl functionality of 2 or 3 and molecular weight of from about 1,000 to about 8,000 in an amount ranging from about 30 to 80 parts, based on the weight of the polyol component, and a second polyol comprising at least one polyol having a functionality greater than 2 and molecular weight less than 1,000 in an amount of from about 20 to about 70 parts by weight, based on the weight of the polyol component, (ii) a surfactant component having a viscosity that is less than about 2500 cp having a polyether-siloxane silicone cell-opening surfactant which has a viscosity greater than 2500 cp and a number average molecular weight of at least 9,000 in an amount that is at least about 0.3 wt. %, based on the weight of the polyol component, (iii) a blowing agent in an amount that is at least 1 wt. %, based on the total weight of the polyol component, (iv) a catalyst component in an amount that is at least about 0.05 wt. %, based on the weight of the polyol component, and C) polyurethane filler particles in an amount that is at least 10 parts, based on the weight of the polyol component.

2. The method of claim 1, wherein the first polyol component comprises non-filled polyethers at 0.5 to about 2%, based on the weight of the polyol component.

3. The method of claim 1, wherein the fillers are used in an amount ranging from about 5 to about 10%, based on the weight of the polyol component.

4. The method of claim 1, wherein the compressive strength is more than 40 psi.

5. The method of claim 1, wherein the polyisocyanate component comprises polymethylene poly(phenyl) isocyanate.

6. The method of claim 1, wherein the first polyol and the second polyol comprise a component selected from the group of polyols consisting of non-filled polyether polyols based on glycerin, propylene oxide, and ethylene oxide, filled polyols, polyether polyols based on propylene glycol, propylene oxide and ethylene oxide, polyether polyols based on ethylene diamine and propylene oxide, amine-initiated polyether polyols and mixtures of the foregoing.

7. An energy-absorbing foam made by the method of claim 1.

8. An energy-absorbing foam containing polyurethane foam containing filler particles and having a compressive strength that is more than 40 psi comprising the reaction product of:

A) a polyisocyanate component,

B) a polyol component comprising:

(i) a first polyol comprising at least one polyol having a hydroxy functionality of 2 or 3 and a molecular weight of from about 1,000 to about 8,000 in an amount ranging from about 30 to about 80 parts, based on the weight of the polyol component, and a second polyol comprising at least one polyol having a functionality greater than 2 and a molecular weight less than 1,000 in an amount of from about 20 to about 70 parts by weight, based on the weight of the polyol component, (ii) a surfactant component having a viscosity that is less than about 2500 cp having a polyether-siloxane silicone cell-opening surfactant having a viscosity greater than 2500 cp and a number average molecular weight that is at least about 9000, in an amount that is at least about 0.3 wt. %, based on the weight of the polyol component, (iii) a blowing agent in an amount that is at least 1 wt. %, based on the total weight of the polyol component, (iv) a catalyst component in an amount that is at least about 0.05 wt. %, based on the weight of the polyol components, and C) polyurethane filler particles in an amount that is at least 10 parts, based on the weight of the polyol component.

9. The foam of claim 8, wherein the first polyol component comprises non-filled polyethers at 0.5 to about 2%, based on the weight of the polyol component.

10. The foam of claim 8, wherein the fillers are used in an amount ranging from about 20 to about 30 parts, based on the weight of the polyol component.

11. The foam of claim 8, wherein the first polyol and the second polyol comprise a component selected from the group of polyols consisting of non-filled polyether polyols based on glycerin, propylene oxide, and ethylene oxide, filled polyols, polyether polyols based on propylene glycol, propylene oxide and ethylene oxide, polyether polyols based on ethylene diamine and propylene oxide, amine-initiated polyether polyols and mixtures of the foregoing.

* * * * *